3,400,020
CARBON-COATED DUPLEX ELECTRODE AND
PROCESS FOR MAKING THE SAME
Joseph O. Carpino, Levittown, and Joseph C. Duddy, Trevose, Pa., and Martin H. Johnson, Verona, Wis., assignors to The Electric Storage Battery Company, a corporation of New Jersey
Filed Nov. 1, 1965, Ser. No. 505,938
13 Claims. (Cl. 136—120)

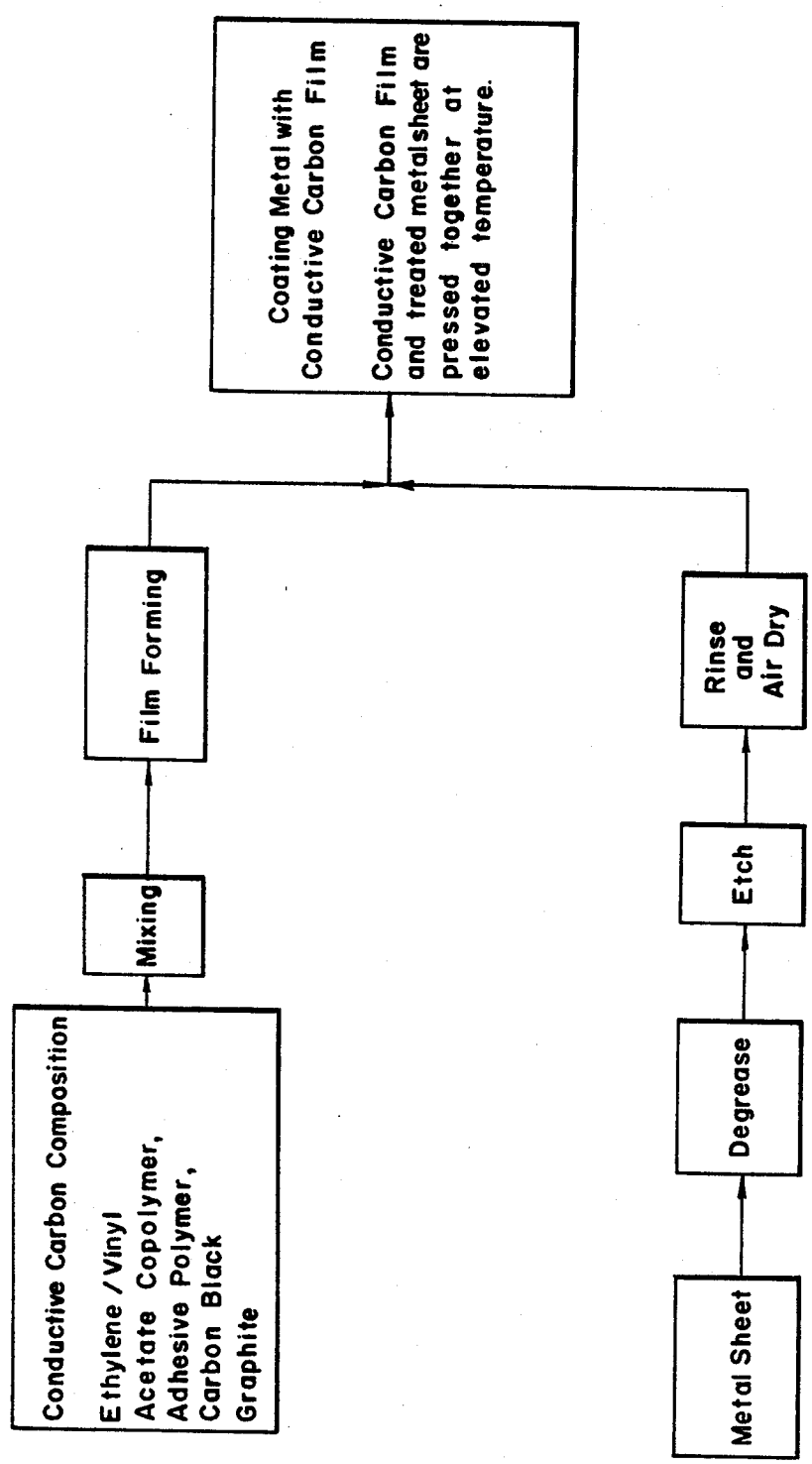

This invention relates to a duplex electrode and to an improved method for manufacturing a duplex electrode in which the electrically conductive film coating has improved electrical conductivity and improved adhesion to the metallic electrode.

In the manufacture of some types of flat Leclanché dry cells or batteries, it is standard practice to utilize a duplex electrode construction. Generally, the duplex electrode comprises a metal plate, such as zinc, which is coated on one side with a thin, electrolyte-impermeable, electrically conductive, carbonaceous film. It is essential that the electrically conductive film be in contact with the entire surface of the metallic electrode and the film should adhere tenaciously to the metal. In order to ensure the adhesion of the conductive film to the metallic electrode, it is standard practice to incorporate a large proportion of adhesive material in the film as a carrier and binder for the conductive material. Unfortunately, as the proportion of adhesive increases, the resistivity of the conductive film increases, and therefore, the internal resistance of the dry cell or battery also increases. Since the internal resistance must be kept to a minimum, the dry cell industry has been searching for a method of manufacturing duplex electrodes which provides improved adhesion of the conductive film to the metallic electrode without impairing the electrical conductivity.

It is an object of this invention to provide a method for preparing a duplex electrode in which the electrically conductive film coating has improved electrical conductivity.

Another object of the invention is to provide a method for improving the adhesion of an electrically conductive film to a metallic electrode.

A still further object is to provide a duplex electrode having a very thin, impervious, electrically conductive film layer which is electrolyte-impermeable and is strongly adhered to the metallic electrode.

Other objects and advantages of this invention will be apparent to those skilled in the art in view of the description which follows, and particularly in view of the drawing in which:

The figure is a flow diagram of a method for preparing a carbon-coated metal sheet in accordance with this invention.

It has been discovered that a duplex electrode, which has both improved electrical conductivity and improved adhesion of the electrically conductive coating to the metallic electrode, can be prepared by utilizing a novel conductive coating composition in combination with a novel treatment of a metallic sheet prior to coating it with the conductive composition. In addition, it has been found that the electrically conductive film coating which is applied to the metallic sheet can readily be prepared without using a solvent and can be rolled into very thin, impervious films. The thinness of these films is a distinct advantage for it helps to save space within the battery or cell which can be better utilized by active material and it helps to reduce the electrical resistivity of the film.

The new and improved electrically conductive coating composition consists essentially of an ethylene/vinyl acetate copolymer, an adhesive polymer, and an electrically conductive powder such as silver, copper, aluminum, zinc, carbon black and/or graphite. The ethylene/vinyl acetate copolymer acts as a binder or carrier for the conductive powder and is an essential ingredient, for it makes it possible to incorporate much greater amounts of conductive powder in the coating composition and still form very thin, impervious films. In fact, the conductive powder may comprise more than half of the composition by weight, and in order to materially improve the conductivity of the duplex electrode, the coating should contain at least about 60% by weight of electrically conductive powder. The ethylene/vinyl acetate copolymer may be present in amounts ranging from about 20 to about 40% by weight of the composition.

The ethylene/vinyl acetate copolymers suitable for use in the conductive coating compositions of this invention can be prepared by methods well known in the art, such as those described in U.S. Patents 2,200,429 and 2,703,794. The vinyl acetate content of suitable copolymers may range from about 15 to 45% by weight. The preferred range of vinyl acetate content is from 25 to 35% by weight. Ethylene/vinyl acetate copolymers having an inherent viscosity of 0.45–1.50 as determined with 0.25% of the copolymer in toluene at 30° C. are suitable, and copolymers having an inherent viscosity of 0.55–1.0 are preferred.

The electrically conductive material used in the conductive composition is a finely divided, highly conductive material such as silver, copper, aluminum, zinc, graphite or acetylene black. It is particularly preferred to use a conductive carbon such as acetylene black, commonly known as Shawinigan Black. If desired, a mixture of conductive metal powders may be used. As previously mentioned, one of the important advantages of this invention is the extremely large amount of conductive powder which can be incorporated in the coating composition. The high conductive powder content plus the ability to produce very thin films provides duplex electrodes having greatly reduced electrical resistivity.

In order to securely attach the conductive coating composition to the metal electrode, it has been found essential that the composition contain a minor amount of an adhesive polymer. Suitable adhesive polymers are polyisobutylene and copolymers of isobutylene commonly called butyl rubber. There should be at least about 1% by weight of adhesive polymer present in the composition, and it may range up to about 10% by weight.

One of the advantages resulting from using the conductive coating compositions of this invention is that they can be formed into a thin, conductive film without using a solvent. The conductive composition can be blended by intensive mixing at an elevated temperature until a uniform dispersion is obtained, and then, the plasticized mass may be formed into sheets or thin films and cooled to room temperature. Another advantage is that the composition can be formed into very thin, imprevious films. This overcomes the prior art problem requiring relatively thick films in order to avoid pinholes. The films of this invention should have a thickness not exceeding about 10 mils.

In accordance with this invention, the conductive coating composition can be applied to several metals to form duplex electrodes. Examples of metals which have been found satisfactory are zinc, magnesium and aluminum. Of these, zinc is preferred because of its greater commercial utilization.

In order to improve the adhesion of the conductive film to the metal electrode, it was found that the surface of the metal electrode would have to be treated in some manner so as to improve its adhesive properties. Conventional carbon-zinc duplex electrodes are generally manufactured by preparing the zinc surface for receiving the carbon film coating with a degreasing or sandblasting treatment. This was tried with a conductive film made in accordance with this invention but the film could still be easily separated from a zinc sheet.

It was discovered that the conductive film can be made to adhere tenaciously to a metal sheet by acid etching the metal surface to which the film is to be applied. The metal sheet is prepared for the coating operation by first degreasing it, and then subjecting it to an etching treatment with an acid solution. After the etching, the metal sheet is rinsed and air dried, and then it is ready to have the conductive film coating applied thereto. The conductive film is applied to the metal sheet by pressing the sheet and the film together between hot platens. Of course, the conductive film is applied to only one side of the metal sheet for the other side must be exposed to the electrolyte.

For a more complete description of this invention, one may refer to the drawing which is a flow diagram of a method for preparing a carbon-coated metal sheet in accordance with this invention. The conductive carbon composition consists essentially of an ethylene/vinyl acetate copolymer, a minor amount of an adhesive polymer such as polyisobutylene, and a finely divided, conductive carbon black mixed with graphite. A typical formulation which may be used is as follows.

| Ingredient: | Amount (parts by wt.) |
|---|---|
| Ethylene/vinyl acetate copolymer | 50 |
| Polyisobutylene | 5 |
| Acetylene carbon black | 115 |
| Graphite | 10 |

It should be noted that this composition contains almost 70% by weight of carbon black and graphite which is an exceptionally large amount of conductive carbon.

The above-listed ingredients may be blended together on a rubber mill until a complete, uniform dispersion is obtained. In order to facilitate the mixing operation, it is generally preferred to thoroughly mix the polymeric ingredients prior to adding the conductive carbon. The blending is carried out at elevated temperatures so as to soften the polymers. A temperature of about 120° C. has been found to be satisfactory for the ethylene/vinyl acetate copolymer and polyisobutylene. To insure thorough blending, the mill rolls should be operated so as to provide a high degree of working or shear in the plasticized mass, and it will generally require from about 5 to about 10 minutes to produce a uniform dispersion.

After the mixing operation, the conductive, carbonaceous composition is sheeted to form a very thin, electrically conductive film. This film forming operation can be performed with the same rubber mill used to effect the mixing. To spread the composition into thin sheets, the mill rolls should be set at equal or approximately equal speeds. The roll temperatures are maintained at about 120° C., and the carbonaceous composition is passed between the rolls which are adjusted to yield a very thin film. In general, the film thickness may range from about 2 to about 10 mils, with 4 to 6 mils being particularly satisfactory. The conductive carbon film is permitted to cool to room temperature and may be stored in flat or coiled form.

In the manufacture of a duplex electrode in accordance with this invention, it has been found necessary to treat the metal sheet prior to applying the conductive film. This pretreatment of the metal sheet is essential in order to improve the adherence of the conductive film. First, the metal sheet is subjected to a degreasing treatment, but if desired, it may be cut to the appropriate electrode size prior to degreasing. Any conventional degreasing treatment will suffice, such as immersing the metal sheet in or washing it with trichloroethylene. Then, the degreased sheet is etched with an acid solution. Any mineral acid can be used, for example, momentary immersion in an aqueous hydrochloric acid solution has been found to be satisfactory.

Since the conductive film is applied to only one side of the metal sheet, only the side of the sheet which is to be coated must be etched, though as a matter of convenience both sides may be etched. An alternative procedure for etching the metal sheet comprises passing one side of the sheet into contact with a wheel of felted material, such as polypropylene which is saturated with an aqueous acid solution. After the metal sheet has been etched, regardless of which procedure is used, it is thoroughly rinsed with distilled water to remove the acid, and then it may be air dried.

The final step in the method of this invention comprises applying the conductive film onto an etched side of the metal sheet. The conductive film covers the entire side of the metal sheet and can be adhered thereto by pressing the film and the sheet together. It is preferred to press the sheet and the film together at elevated temperatures, but it can be done at room temperature. In the preferred embodiment illustrated in FIG. 1, the conductive carbon film and the metal sheet may be placed together and pressed by a hot platen between suitable backing strips. It has been found that a platen temperature of about 250° F. is satisfactory, and an applied pressure of about 5500 p.s.i. is sufficient and need be applied only momentarily. The backing may comprise a layer of heavy manila paper placed adjacent to the platen and a treated release-paper between it and the conductive film. The manila paper functions as a cushion when the pressure is applied, and the release paper prevents sticking to the conductive film.

The electrical resistance of duplex electrodes made in accordance with this invention is lower than the resistance of prior art duplex electrodes, and the conductive film coating is more firmly adhered to the metal sheet. The following example illustrates the method of this invention for making carbon-coated zinc duplex electrodes:

EXAMPLE I

The following ingredients were added to a rubber mill in the order lister.

| Ingredient: | Amount (pts. by wt.) |
|---|---|
| Ethylene/vinyl acetate copolymer (Elvax 250) | 50 |
| Polyisobutylene (Vistanex L-80) | 5 |
| Shawinigan Black | 115 |
| Graphite (Dixon 200-08) | 10 |

The mill rolls were maintained at 120° C., and the ingredients were blended for about 6 minutes. Then the rolls were set at equal speeds and maintained at 120° C. while the blended carbonaceous composition was passed therebetween to form a thin conductive film having a thickness of 5 mils.

A zinc strip having a 1.5 inch width was cut into 6 inch lengths. These pieces of zinc were degreased by washing them with trichloroethylene. Then the degreased zinc pieces were immersed for 30 seconds into an aqueous HCl solution comprising 3 parts by volume of 37% HCl and 1 part by volume of distilled water. Thereafter, the zinc pieces were thoroughly rinsed with distilled water and were air dried.

The conductive carbon film was applied to the etched zinc pieces by pressing the film and the zinc together with a hot platen maintained at 250° F. The applied pressure of 5500 p.s.i. was exerted only momentarily.

In a test comparing one of these duplex electrodes and a standard duplex zinc electrode which was sandblasted prior to applying a carbon coating having only polyisobutylene as the carbon carrier, the standard had an electrical resistivity of 0.080 ohm whereas the resistivity of the electrode of this invention was only 0.057 ohm. In addition, the carbon coating on the zinc duplex electrode made in accordance with this invention could not be separated from the zinc by flexing, bending or peeling whereas the carbon coating on the standard electrode was removed quite easily.

EXAMPLE II

Duplex electrodes in accordance with this invention were prepared utilizing aluminum and magnesium sheets as the metallic electrode component. The following formulation was used to prepare the carbonaceous film.

Ingredient: Amount (pts. by wt.)
Ethylene/vinyl acetate copolymer (Elvax 260) 50
Polyisobutylene (Vistanex L–80) _____ 5
Shawinigan Black _____ 115
Graphite (Dixon 200–08) _____ 10

The above-listed polymeric ingredients were mixed on a rubber mill whose rolls were maintained at about 120° C. After blending for about 5 minutes, the carbonaceous ingredients were added and the mixing was continued for an additional 3 minutes. Then the mill rolls were set at equal speeds and maintained at 120° C. while the blended carbonaceous composition was passed therebetween to form a thin, impervious conductive film having a thickness of about 5 mils.

Aluminum and magnesium sheets were each cut to form 2 pieces of aluminum and 2 pieces of magnesium having dimensions of about 2 x 3.5 inches. These were degreased with trichloroethylene and 1 piece of each metal was etched by immersing them into an aqueous HCl solution for about 30 seconds. The etched pieces were washed with distilled water and were air dried. The other pieces were not etched but were physically roughened.

The conductive carbon film was applied to all 4 pieces by pressing the film and the metal together with a hot platen maintained at 250° F. The applied pressure of 5500 p.s.i. was exerted only momentarily. After allowing the carbon coated pieces to cool, they were tested to determine the quality of the adhesion between the metal sheet and the carbon coating. The metal sheets which had been etched exhibited superior adhesion.

In the above examples, the conductive carbon film was applied to the metal sheets which had previously been cut into pieces. One of the advantages of the method of this invention is that it can easily be adapted to high speed production techniques. For example, the metal sheet can be in the form of a continuous strip which is etched in accordance with this invention, and then the thin conductive film may be applied thereto from a roll of the thin film. Thereafter, the coated metal sheet can be cut or stamped to the proper electrode size.

In the figure and the examples, the electrically conductive film was rendered conductive by incorporating a mixture of carbon and graphite in the polymeric composition. As previously indicated, it is within the scope of this invention to use conductive metal powders such as silver, copper, aluminum and zinc.

Having completely described this invention, what is claimed is:

1. A method for preparing a duplex electrode which comprises
   (a) thoroughly mixing at an elevated temperature an ethylene/vinyl acetate copolymer, an adhesive polymer selected from the group consisting of polyisobutylene and butyl rubber, and an electrically conductive powder so as to produce a conductive composition containing at least about 60% by weight of conductive powder, about 20 to about 40% by weight of ethylene/vinyl acetate copolymer and from about 1 to about 10% by weight of adhesive polymer, and thereafter, forming this composition into an electrically conductive, impervious film having a thickness ranging from about 2 to about 10 mils;
   (b) degreasing a metal sheet selected from the group consisting of zinc, magnesium and aluminum and then etching it on at least one side by contacting it with an aqueous mineral acid solution, after which it is rinsed and dried; and
   (c) applying the electrically conductive, impervious film produced in step (a) to the etched metal sheet of step (b) by pressing the film onto an etched surface of the metal sheet.

2. A method in accordance with claim 1 in which the ethylene/vinyl acetate copolymer has a vinyl acetate content ranging from about 15 to 45% by weight, the adhesive polymer is polyisobutylene and the conductive powder is silver, copper, aluminum, zinc, carbon black, graphite or mixtures thereof.

3. A method in accordance with claim 1 in which the metal sheet is zinc.

4. A method in accordance with claim 2 in which the metal sheet is zinc.

5. A method in accordance with claim 3 in which the conductive powder is carbon.

6. A method in accordance with claim 4 in which the conductive powder is carbon.

7. A method in accordance with claim 1 which comprises
   (a) thoroughly mixing at 120° C. a carbonaceous composition consisting essentially of the following ingredients and amounts:

Parts by wt.
   ethylene/vinyl acetate copolymer _____ 50
   polyisobutylene _____ 5
   carbon black _____ 115
   graphite _____ 10 and thereafter forming this composition into an electrically conductive carbon film having a thickness ranging from about 4 to about 6 mils;
   (b) degreasing a zinc sheet with trichlorethylene and then etching it on at least one side by contacting it with an aqueous hydrochloric acid solution, afterwhich it is rinsed and dried; and
   (c) applying the conductive carbon film produced in step (a) to the etched zinc sheet of step (b) by pressing the hot platen at a temperature of about 250° F. and with a pressure of about 5500 p.s.i.

8. A duplex electrode comprising:
   (a) a metal sheet selected from the group consisting of zinc, magnesium and aluminum, the metal sheet having at least one etched surface; and,
   (b) an electrically conductive, impervious film adhering to the etched surface of the metal sheet, the film being composed of
      (i) an ethylene/vinyl acetate copolymer,
      (ii) an adhesive polymer selected from the group consisting of polyisobutylene and butyl rubber, and
      (iii) an electrically conductive powder, in which the conductive film contains at least about 60% by weight of conductive powder, about 20% to about 40% by weight of ethylene/vinyl acetate copolymer and from about 1% to about 10% by weight of adhesive polymer, the conductive film having a thickness ranging from about 2 to about 10 mils.

9. The duplex electrode of claim 8 wherein the ethylene/vinyl acetate copolymer has a vinyl acetate content ranging from about 15% to about 45% by weight, the adhesive polymer is polyisobutylene and the conductive powder is silver, copper, aluminum, zinc, carbon black, graphite or mixtures thereof.

10. The duplex electrode of claim 8 wherein the metal sheet is zinc.

11. The duplex electrode of claim 9 wherein the metal sheet is zinc.

12. The duplex electrode of claim 10 wherein the conductive powder is carbon.

13. The duplex electrode of claim 11 in which the powder is carbon.

References Cited

UNITED STATES PATENTS

| | | | |
|---|---|---|---|
| 3,178,384 | 4/1965 | Rice et al. | 260—28.5 |
| 3,276,911 | 10/1966 | Schoeneweis | 136—120 |
| 3,353,999 | 11/1967 | Osborn | 136—83 |

WINSTON A. DOUGLAS, *Primary Examiner.*

A. SKAPARS, *Assistant Examiner.*